(12) United States Patent
Zhou et al.

(10) Patent No.: US 10,855,044 B2
(45) Date of Patent: Dec. 1, 2020

(54) OPTICAL AMPLIFIER

(71) Applicant: Molex, LLC, Lisle, IL (US)

(72) Inventors: Fengqing Zhou, Fremont, CA (US); Tian Zhu, Fremont, CA (US); Haifeng Lv, Zhuhai (CN); Yu Hu, Zhuhai (CN)

(73) Assignee: Molex, LLC, Lisle, IL (US)

( * ) Notice: Subject to any disclaimer, the term of this patent is extended or adjusted under 35 U.S.C. 154(b) by 290 days.

(21) Appl. No.: 15/758,154

(22) PCT Filed: Sep. 7, 2015

(86) PCT No.: PCT/CN2015/089040
§ 371 (c)(1),
(2) Date: Mar. 7, 2018

(87) PCT Pub. No.: WO2017/041206
PCT Pub. Date: Mar. 16, 2017

(65) Prior Publication Data
US 2018/0254599 A1  Sep. 6, 2018

(51) Int. Cl.
*H01S 3/094* (2006.01)
*G02F 1/09* (2006.01)
(Continued)

(52) U.S. Cl.
CPC ...... *H01S 3/094011* (2013.01); *G02B 6/2746* (2013.01); *G02F 1/093* (2013.01);
(Continued)

(58) Field of Classification Search
CPC .. H01S 3/094011; H01S 3/093; H01S 3/0064; H01S 3/06704; H01S 3/1001; G02F 1/093; G02B 2006/12157
See application file for complete search history.

(56) References Cited

U.S. PATENT DOCUMENTS

| 5,493,440 | A | | 2/1996 | Souda et al. |
| 5,737,118 | A | * | 4/1998 | Sugaya ............... H01S 3/1001 359/341.43 |

(Continued)

FOREIGN PATENT DOCUMENTS

| CN | 2563591 Y | 7/2003 |
| CN | 203414622 U | 1/2014 |

(Continued)

OTHER PUBLICATIONS

International Search Report and Written Opinion received for PCT application No. PCT/CN2015/089040, dated Jun. 13, 2016, 9 pages.

(Continued)

*Primary Examiner* — Eric L Bolda (57) ABSTRACT

An optical amplifier includes an input port for receiving an input optical signal; a wavelength division multiplexer (204) having a first input coupled to the input port, a second input coupled to a pump source (206), and an output coupled to an amplification fiber (208); and an integrated component (210) configured to provide output monitoring and isolation, wherein the integrated component (210) is configured to separate a first portion of a light signal received from the amplification fiber (208), direct the first portion to a photo detector, direct a second portion of the input light from the amplification fiber (208) to an output port, and attenuate light signals received from the output port.

11 Claims, 9 Drawing Sheets

(51) Int. Cl.
    *H01S 3/067*     (2006.01)
    *H01S 3/10*     (2006.01)
    *H01S 3/00*     (2006.01)
    *G02B 6/27*     (2006.01)
    *H04B 10/293*     (2013.01)
    *G02F 1/39*     (2006.01)
    *H01S 3/16*     (2006.01)
    *H01S 3/13*     (2006.01)

(52) U.S. Cl.
    CPC .............. *G02F 1/39* (2013.01); *H01S 3/0064* (2013.01); *H01S 3/06704* (2013.01); *H01S 3/06754* (2013.01); *H01S 3/10023* (2013.01); *H04B 10/293* (2013.01); *H01S 3/06712* (2013.01); *H01S 3/094003* (2013.01); *H01S 3/1001* (2019.08); *H01S 3/13013* (2019.08); *H01S 3/1608* (2013.01)

(56) References Cited

U.S. PATENT DOCUMENTS

| | | | |
|---|---|---|---|
| 6,330,117 B1* | 12/2001 | Seo ..................... | H01S 3/06754 359/702 |
| 6,865,017 B2 | 3/2005 | Chen | |
| 7,130,121 B2 | 10/2006 | Pan et al. | |
| 7,440,163 B1* | 10/2008 | Zhou ................. | G02B 6/29361 359/333 |
| 8,098,425 B2 | 1/2012 | Zhang et al. | |
| 2001/0012147 A1 | 8/2001 | Lutz et al. | |
| 2002/0154403 A1* | 10/2002 | Trotter, Jr. .............. | G02F 1/093 359/484.03 |
| 2002/0181100 A1* | 12/2002 | Cao ...................... | G02B 5/3083 359/484.04 |
| 2003/0206335 A1* | 11/2003 | Pan ...................... | G02B 6/4201 359/341.33 |

FOREIGN PATENT DOCUMENTS

| | | |
|---|---|---|
| CN | 103941342 A | 7/2014 |
| CN | 204575906 U | 8/2015 |
| CN | 204575907 U | 8/2015 |
| JP | H07-64021 A | 3/1995 |
| JP | H08-234046 A | 9/1996 |
| JP | H08-262374 A | 10/1996 |
| JP | 2006-228790 A | 8/2006 |
| JP | 2008-003211 A | 1/2008 |
| JP | 2011-090291 A | 5/2011 |
| WO | 2017/041206 A1 | 3/2017 |

OTHER PUBLICATIONS

International Preliminary Report on Patentability received for PCT Application No. PCT/CN2015/089040, dated Mar. 22, 2018, 6 pages.

Office Action received for Japanese Application No. 2018-530950, dated Mar. 5, 2019, 12 pages. (6 pages of English Translation and 6 pages of Official Copy).

Extended European Search Report received for European Patent Application No. 15903313.3, dated Mar. 6, 2019, 16 pages.

* cited by examiner

OPTICAL AMPLIFIER

This application is a national stage of International Application No. PCT/CN2015/089040, filed Sep. 7, 2015, which is incorporated herein by reference in its entirety.

TECHNICAL FIELD

This specification relates to optical communications.

BACKGROUND

Optical fiber amplifiers are commonly used in communication systems. Types of optical fiber amplifiers include Rare Earth Doped Fiber Amplifiers, for example, Erbium Doped Fiber Amplifiers ("EDFAs"). The optical fiber amplifiers are usually pumped by one or more light emitter diode (LEDs) or laser pump sources.

An erbium doped fiber (EDF) is a form of a single-mode fiber, having a core that is heavily doped with erbium. Conventional EDFA's include a pump laser that provides a pump light to the EDF to provide amplification of an input optical signal. For example, when pump light at 980 nm or 1480 nm is injected into an EDF, the erbium atoms absorb the pump light, which pushes the erbium atoms into excited states. When stimulated by light beams, for example an input optical signal having one or more wavelengths, e.g., in a C-band (1528 1570 nm) or an L band (1570-1620 nm), the excited atoms return to a ground or lower state by stimulated emission. The stimulated emission has the same wavelength as that of the stimulating light. Therefore, the optical signal is amplified as it is propagating through the EDF.

SUMMARY

This specification describes technologies relating to optical amplifiers.

In general, one innovative aspect of the subject matter described in this specification can be embodied in optical amplifiers that include an input port for receiving an input optical signal; a wavelength division multiplexer having a first input coupled to the input port, a second input coupled to a pump source, and an output coupled to an amplification fiber; and an integrated component configured to provide output monitoring and isolation, wherein the integrated component is configured to: separate a first portion of a light signal received from the amplification fiber, direct the first portion to a photo detector, and direct a second portion of the input light from the amplification fiber to an output port, and wherein the integrated component is configured to attenuate light signals received from the output port. Other embodiments of this aspect include corresponding methods, apparatus, and systems.

The foregoing and other embodiments can each optionally include one or more of the following features, alone or in combination. The optical amplifier further includes a controller configured to receive an electrical signal from the photo detector and to control an output power of the pump source based at least in part on the received electrical signal. The integrated component attenuates light received from the output port by 10 dB or higher. The optical amplifier further includes an isolator and a tap positioned between the input port and the wavelength division multiplexer. The optical amplifier includes a second photo detector coupled to the tap configured to monitor the input optical signal. The optical amplifier includes a second integrated component positioned between the input port and the wavelength division multiplexer, the second integrated component configured to provide input monitoring and isolation wherein the integrated component is configured to: separate a first portion of the input optical signal received from the first port, direct the first portion to a photo detector and, direct a second portion of the input optical signal to an output coupled to the wavelength division multiplexer, and wherein the second integrated component is configured to attenuate light signals received from the wavelength division multiplexer. The wavelength division multiplexer is combined with an isolator forming a third integrated component.

In general, one innovative aspect of the subject matter described in this specification can be embodied in optical amplifiers that include an input port for receiving an input optical signal; a first integrated component comprising an isolator and a wavelength division multiplexer, wherein the integrated component has a first input coupled to the input port for receiving the input optical signal, a second input coupled to a pump source, and an output coupled to an amplification fiber; and a second integrated component configured to provide output monitoring and isolation, wherein the second integrated component is configured to: separate a first portion of input light from the amplification fiber, direct the first portion to a photo detector, and direct a second portion of the input light from the amplification fiber to an output port, and wherein the second integrated component is configured to attenuate light signals received from the output port. Other embodiments of this aspect include corresponding methods, apparatus, and systems.

The foregoing and other embodiments can each optionally include one or more of the following features, alone or in combination. The optical amplifier further includes a controller configured to receive an electrical signal from the photo detector and to control an output power of the pump source based at least in part on the received electrical signal. The first integrated component attenuates light received from the amplifier fiber by 10 dB or higher; and the second integrated component attenuates light received from the output port by 10 dB or higher.

In general, one innovative aspect of the subject matter described in this specification can be embodied in optical amplifiers that include an input port for receiving an input optical signal; a first integrated component configured to provide input monitoring and isolation, wherein the first integrated component is configured to: separate a first portion of the input optical signal, direct the first portion to a first photo detector, and to direct a second portion of the input optical signal to a wavelength division multiplexer, and wherein the first integrated component is configured to attenuate light signals received from the wavelength division multiplexer; the wavelength division multiplexer having a first input coupled to an output of the first integrated component, a second input coupled to a pump source, and an output coupled to an amplification fiber; and a second integrated component configured to provide output monitoring and isolation, wherein the second integrated component is configured to: separate a first portion of input light from the amplification fiber, direct the first portion to a second photo detector, and to direct a second portion of the input light from the amplification fiber to an output port, and wherein the second integrated component is configured to attenuate light signals received from the output port. Other embodiments of this aspect include corresponding methods, apparatus, and systems.

The foregoing and other embodiments can each optionally include one or more of the following features, alone or in combination. The optical amplifier further includes a controller configured to receive a first electrical signal from the first photo detector and a second electrical signal received from the second photo detector and to control an output power of the pump source based at least in part on the received first and second electrical signals.

In general, one innovative aspect of the subject matter described in this specification can be embodied in integrated components that include an input optical fiber and an output optical fiber; a birefringent crystal having a first surface facing an end of the input optical fiber and the output optical fiber and a second surface facing a wave plate, wherein the wave plate covers a portion of the birefringent crystal; a lens optically positioned between the wave plate and a polarization rotator; and a prism positioned between the polarization rotator and a photodetector. Other embodiments of this aspect include corresponding methods, apparatus, and systems.

The foregoing and other embodiments can each optionally include one or more of the following features, alone or in combination. The polarization rotator is a Faraday rotator. The input optical fiber and the output optical fiber are held in a common package. An input optical signal received at the input optical fiber is routed to the prism, wherein the prism passes a portion of the input optical signal to the photo detector and reflects a portion of the input optical signal toward the output optical fiber. An input optical signal received at the output optical fiber passes through elements of the integrated component such that the optical signal does not pass through the input optical fiber.

Particular embodiments of the subject matter described in this specification can be implemented so as to realize one or more of the following advantages. Using an integrated component that provides isolation and tapping of a portion of an optical signal reduces the size and number of components for an EDFA. The integrated component can be swapped as a unit from the EDFA making replacement easy. Additionally, the integrated component can be incorporated such that the EDFA is XFP MSA compliant (e.g., 10 GB small form factor pluggable) and compatible with an XFP form factor without significant redesign.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
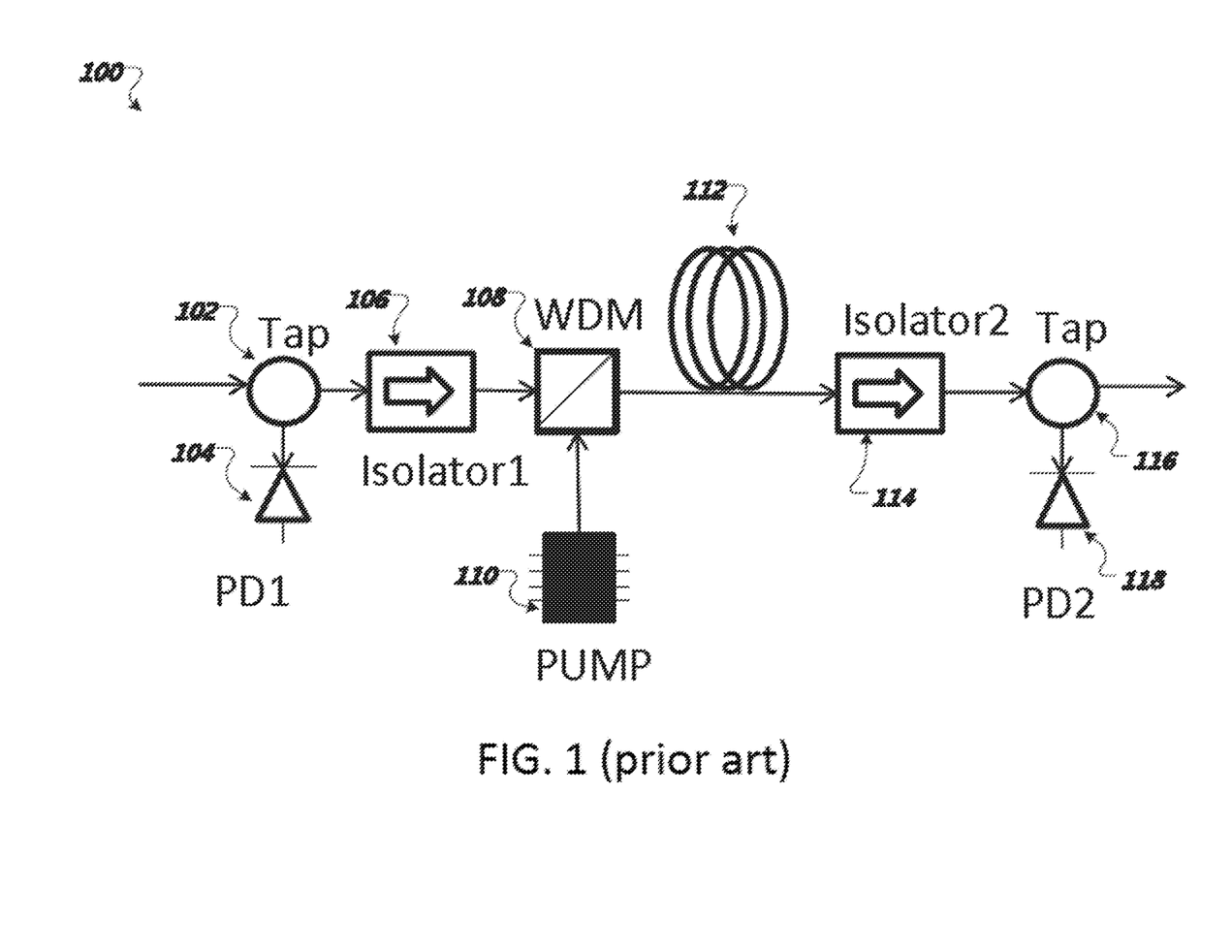
FIG. 1 is diagram of an example prior art erbium doped fiber amplifier.

FIG. 1 is diagram of an example prior art erbium doped fiber amplifier (EDFA) 100. The EDFA 100 includes a first tap 102 coupled to an input optical port configured to receive an input optical signal having one or more wavelengths. The input optical port can be coupled to an optical fiber that couples the EDFA 100 to one or more optical components or fibers. The first tap 102 separates a small portion of the input optical signal and outputs this tapped portion to a first photo detector 104. The first photo detector 104 can be a photodiode and measures an input power of the input optical signal. The remaining portion of the input optical signal is output from the first tap 102 to a first isolator 106 coupled to the first tap 102.

The first isolator 106 is configured to provide transmission of light signals in one direction. Thus, the first isolator 106 can block or greatly reduce optical signals passing back toward the input optical fiber. The output of the first isolator 106 is coupled to an input of a wavelength division multiplexer (WDM) 108, whose second input is provided by a pump source 110.

The pump source 110 can be a pump laser, a light emitting diode, or other light source. In some implementations, the pump source 110 receives a control signal from an electrical controller (not shown) for varying an output power of the light emitted by the pump source 110. For example, the control signal can be a signal for increasing or decreasing the pump light directed toward the WDM 108.

The WDM 108 is configured as a combiner that operates to combine the input optical signal and the injected pumping signal provided from the pumping source 110 and provides a combined output optical signal to an amplifier fiber 112. In some implementations, the WDM 108 combines an input signal having a particular wavelength, e.g., 1550 nm, with an injected pumping signal having a different wavelength, e.g., 980 nm. The amplifier fiber 112 can be an EDF.

The amplified optical signal output from the amplifier fiber 112 is provided as an input to a second isolator 114. The second isolator can be configured to prevent optical signals from passing back toward the amplifier fiber 112. The output of the second isolator 114 is coupled to an input of a second tap 116. The second tap 116 taps off a small portion of the amplified optical signal and outputs the tapped portion to a second photo detector 118. The second photo detector 118 can be a photodiode and used to measure an output power of the amplified optical signal. The remaining portion of the amplified optical signal is output from the second tap 116 to an output optical fiber.

The first and second photo detectors 104 and 118 convert the incident light signals to electrical signals. The electrical signals can be used by the controller to measure the input optical signal power and the amplified output optical signal power. The controller can use the measured input optical signal power and amplified output optical signal power to control performance of the pump source 110.

Figure 2:
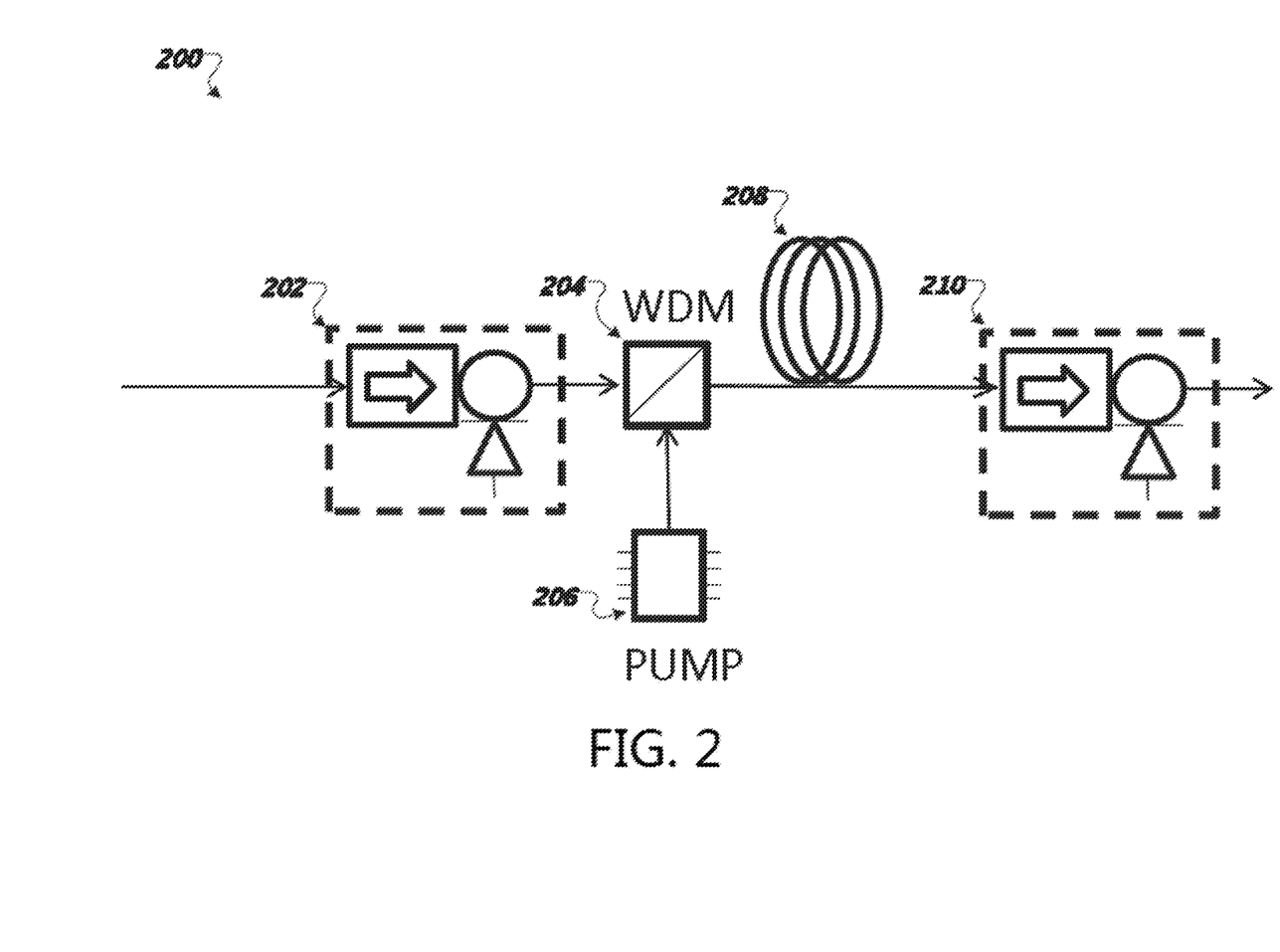
FIG. 2 is a diagram of an example EDFA including integrated components.

FIG. 2 is a diagram of an example EDFA 200. The EDFA 200 includes an input port for receiving an input optical signal, e.g., from an input optical fiber. The input port is coupled to a first integrated component 202. The first integrated component 202 is configured to provide isolation and signal monitoring functions of an isolator, tap, and photo detector, e.g., first isolator 106, first tap 102, and first photo detector 104 of the EDFA shown in FIG. 1.

The optical signal output from the first integrated component 202 is coupled to an input of a WDM 204, whose second input is provided by a pump source 206.

The pump source 206 can be a pump laser, a light emitting diode, or other light source. In some implementations, the pump source 206 receives a control signal from an electrical controller (not shown) for varying the output power of the pump source 206. For example, the control signal can be a signal for increasing or decreasing the pump light directed toward the WDM 204.

The WDM 204 is configured as a combiner that operates to combine the input optical signal and the injected pumping signal provided from the pumping source 206 and provides an output optical signal to an amplifier fiber 208. The amplified optical signal output from the amplifier fiber 208 is provided as an input to a second integrated component 210. Similar to the first integrated component 202, the second integrated component 210 is configured to provide isolation and signal monitoring functions of an isolator, tap, and photo detector, e.g., second isolator 114, second tap 116, and second photo detector 118 of the EDFA shown in FIG. 1. The first integrated component 202 and the second integrated component 210 can each be provided in an integrated package for assembly in an EDFA housing.

Figure 3:
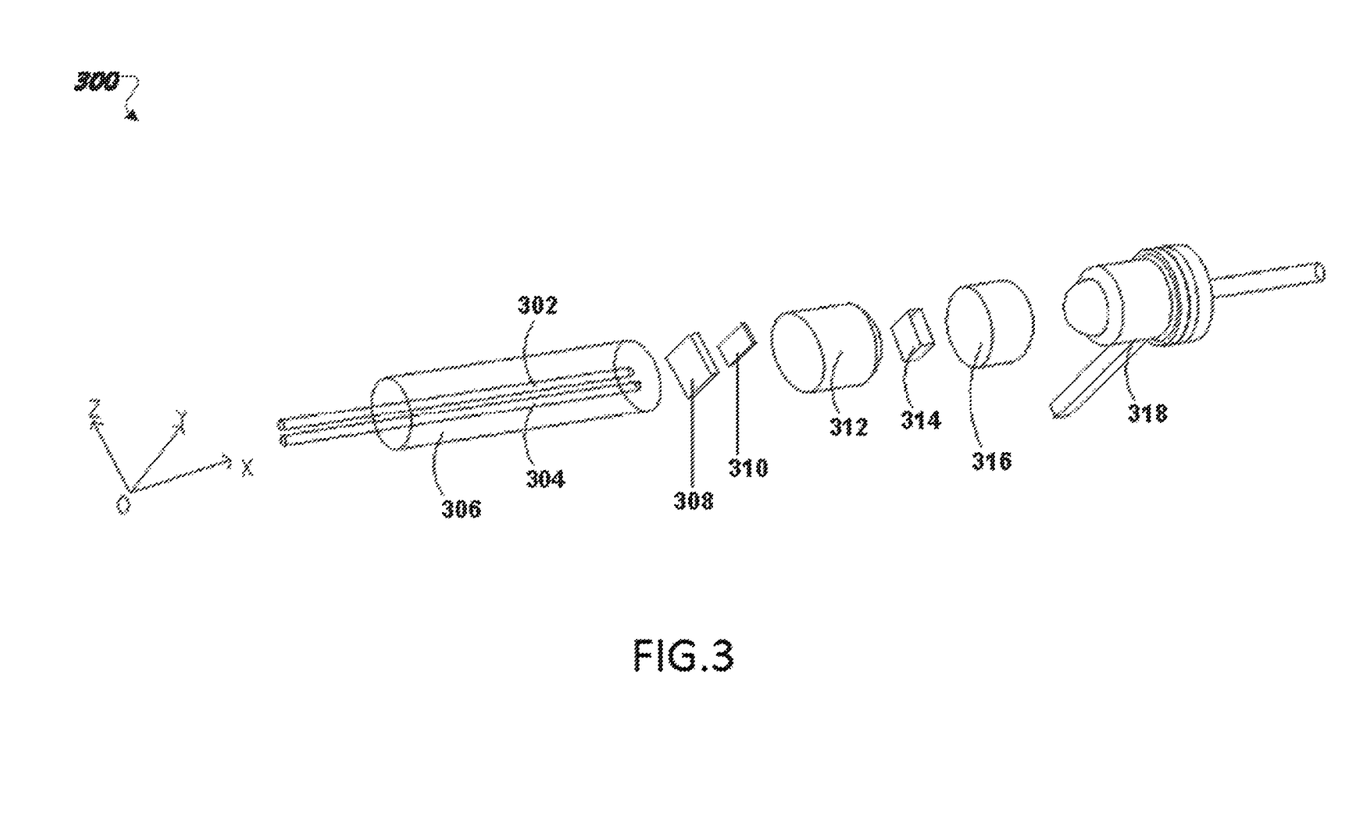
FIG. 3 is a diagram of an example integrated component.

FIG. 3 is a diagram of an example integrated component 300. The integrated component 300 includes an input optical fiber 302 and an optical output fiber 304. The input optical fiber 302 and the output optical fiber 304 can be packaged together, for example, in a tube 306. The tube 306 can be a glass tube or other suitable material. In some implementations, the optical fibers are held in a fiber ferrule or other suitable structure.

The integrated component 300 also includes a birefringent crystal 308 positioned between the tube 306 and a half wave plate 310. The half wave plate 310 can be positioned to be along the light path of the input optical fiber 302, but not the light path of the output optical fiber 304. The birefringent crystal 308 is configured, for example, to separate incident light having random polarization directions into two orthogonally polarized light beams. A wave plate such as the half wave plate 310 rotates a polarization of incident light beams by a specified number of degrees in a particular direction depending on the composition of the wave plate.

Figure 4:
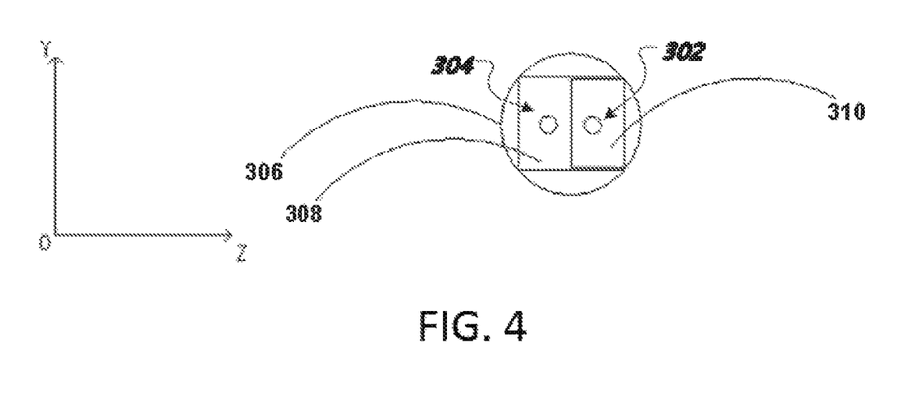
FIG. 4 is a diagram showing relative placement of tube, birefringent crystal, and half wave plate of the integrated component of FIG. 3

FIG. 4 is a diagram showing relative placement of tube 306, birefringent crystal 308, and half wave plate 310 of the integrated component 300 of FIG. 3. In particular, the birefringent crystal 308 is positioned at an end face of the tube 306 such that the birefringent crystal 308 covers both the input and output optical fibers 302, 304 and therefore is in the optical path of light entering or exiting the input optical fiber 302 and the output optical fiber 304. However, the half wave plate 310 is positioned on top of a portion of the birefringent crystal 308 such that the half wave plate 310 is only in an optical path of light directed to or from the input optical fiber 302 and is not in the optical path of light directed toward the output optical fiber 304.

Returning to FIG. 3, the integrated component 300 also includes a lens 312 positioned between the half wave plate 308 and a Faraday rotator 314. The Faraday rotator 314 is an optical component that rotates a polarization of light passing through the Faraday rotator 314 by a specific amount in response to an applied magnetic field. The lens 312 can be used, for example, to focus one or more light beams toward particular optical components, e.g., to focus light on the Faraday rotator 314.

The integrated component 300 also includes a prism 316 positioned along an optical path between the Faraday rotator 314 and a photo detector 318. The prism 316 is described in greater detail with respect to FIG. 5.

Figure 5:
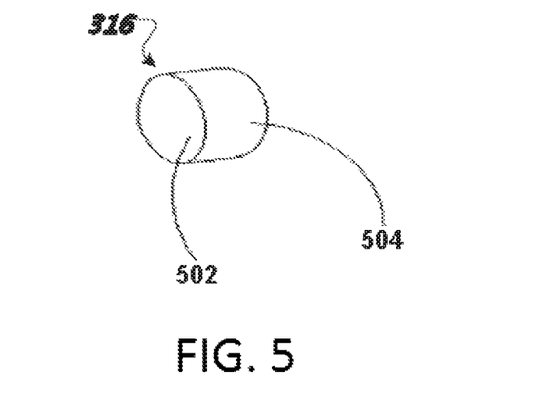
FIG. 5 is a diagram of the prism of the integrated component of FIG. 3.

FIG. 5 is a diagram of the prism 316 of the integrated component of FIG. 3. The prism 316 includes a first end surface 502 facing an end surface of the Faraday rotator 314. The first end surface 502 of the prism 316 has a partial reflective coating that reflects a percentage X of the input optical signal while allowing 1-X percent to pass through the prism 316. In some implementations, the value of X is greater than 90 percent.

The prism 316 also includes a second end surface 504 facing the photo detector 318. The second end surface 504 is configured to have a high reflection for wavelengths corresponding to a pump source and low or no reflection for wavelengths of the optical signal. Thus it allows the optical signals reach the photo detector, but prevents the pump signals reach the photo detector. Additionally, in some implementations, the first end surface 502 and the second end surface 504 are not parallel to each other. In some implementations, instead of the prism 316, a different optical component can be used, for example, an elliptic cylinder with a thin film coating. The thin film coating reflects a portion of incident light and passes a second portion of incident light to the photo detector 318. In some implementations, the coating reflects most of the incident light e.g., greater than 90 percent.

Returning to FIG. 3, the photo detector 318 converts received light signals into electrical signals. The signals can be sent, e.g., to a controller of an amplifier, to calculate a power measurement for the optical signal. For example, the integrated component 300 can be positioned to monitor an input optical signal power to an EDFA. In another example, the integrated component can be position to monitor an amplified optical signal output by an amplification fiber of the EDFA.

Figure 6:
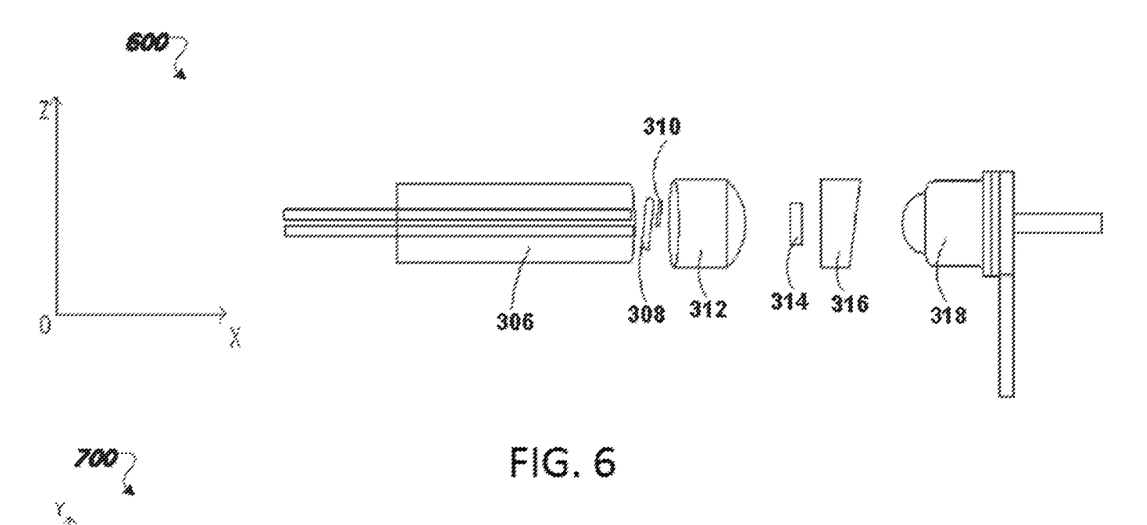
FIG. 6 is a side view of the integrated component of FIG. 3 on an x-z plane.
Figure 7:
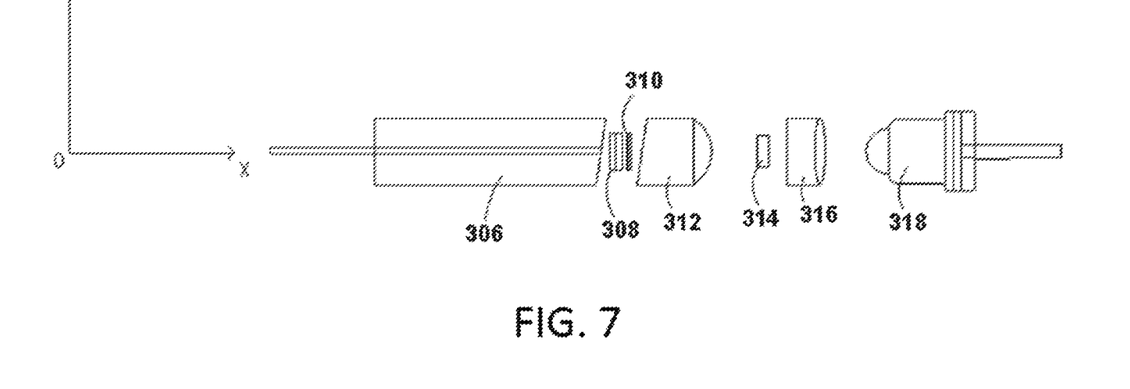
FIG. 7 is a top view of the integrated component of FIG. 3 on a x-y plane.

FIG. 6 is a side view 600 of the integrated component 300 of FIG. 3 on an x-z plane. FIG. 7 is a top view 700 of the integrated component 300 of FIG. 3 on an x-y plane. As shown in FIGS. 6 and 7, the integrated component 300 includes tube 306 holding an input optical fiber and an output optical fiber, birefringent crystal 308, half wave plate 310, lens 312, faraday rotator 314, prism 316, and photo detector 318. As shown in the side view 600, the birefringent crystal 308 and half wave plate 310 are not parallel to the end face of the tube or to the z-axis. Additionally, the half wave plate 310 is shown as positioned such that light from the input optical fiber passes through the half wave plate 310 but light directed toward the output optical fiber does not pass through the wave plate 310.

Figure 8:
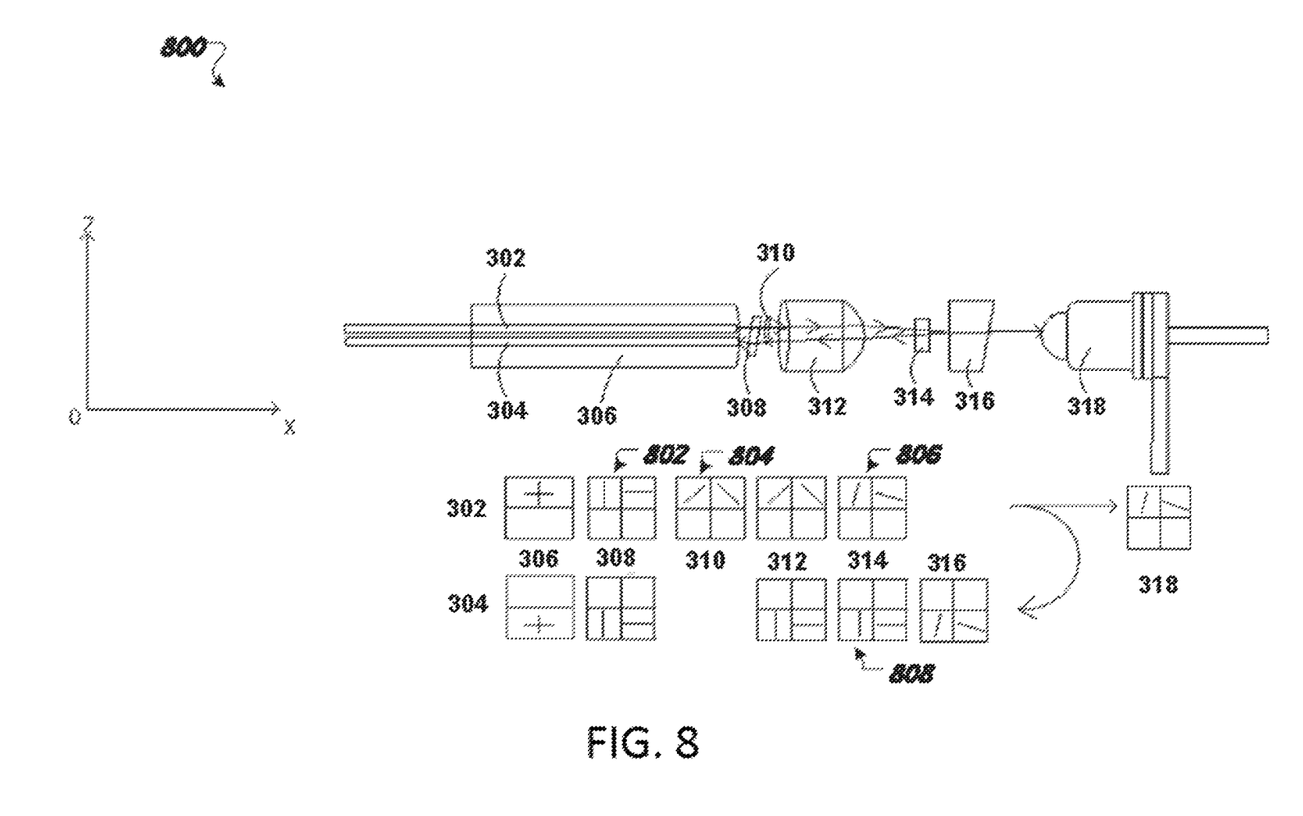
FIG. 8 is a side view of the integrated component of FIG. 3 on the x-z plane showing polarization states.

FIG. 8 is a side view 800 of the integrated component 300 of FIG. 3 on the x-z plane showing polarization states. In particular, the polarization states are shown for light beams passing from the input optical fiber 302 to the output optical fiber 304.

A light beam, e.g., an optical signal having one or more wavelength, enters the integrated component 300 through the input optical fiber 302. The light beam can be randomly polarized. After the light beam exits the input optical fiber 302, the light beam passes through the birefringent crystal 308.

The birefringent crystal 308 separates the optical beam into a first light beam having a first polarization direction and a second light beam having a second polarization direction where the respective polarization directions are orthogonal, as illustrated by box 802 showing the polarization state and location for the two beams relative to a cross-section of the integrated component 300 following the birefringent crystal 308. As shown in box 802, the light beams have been separated in the upper path along the y-axis.

The first and second light beams are located in the upper portion of a cross section of the integrated device and therefore pass through the half wave plate 310 after exiting the birefringent crystal 308. The half wave plate 310 rotates the polarization of each light beam by 45 degrees clockwise as illustrated by box 804. The first and second light beams pass through the lens 312 without any change in polarization as the first and second light beams are directed toward Faraday rotator 314. The Faraday rotator rotates the polarization direction of both the first light beam and the second light beam counter-clockwise by 22.5 degrees as illustrated by box 806.

The first and second light beams exiting from the Faraday rotator 314 are directed toward the prism 316. The prism 316 has a film coating that passes a first portion of the light beams while allowing second portion to reflect. The first portion passes through the prism 316 with the same polarization directions and is focused on the photo detector 318. For example, the passed portion can be a small portion of the light beams incident on the prism 316. The light detected by the photo detector 318 can be used, e.g., by a controller of an EDFA, to measure overall optical signal power.

The second portion of the light beams are reflected from the prism 316 relative to the y-axis and have the same polarization directions but a relative location mirrored to the lower path of the cross section. The reflected light beams pass back through the Faraday rotator 314 where the polarization directions are further rotated by 22.5 degrees counter-clockwise as illustrated by box 808 showing both polarization directions and locations for the reflected light beams.

The reflected light beams pass through the lens 312 without a change in polarization direction and are then incident on the birefringent crystal 308 where, because of the respective locations and polarization directions, the two reflected light beams are merged into one beam exiting the birefringent crystal 308. The merged light beam then enters the output optical fiber 304 and exits the integrated component 300.

Figure 9:
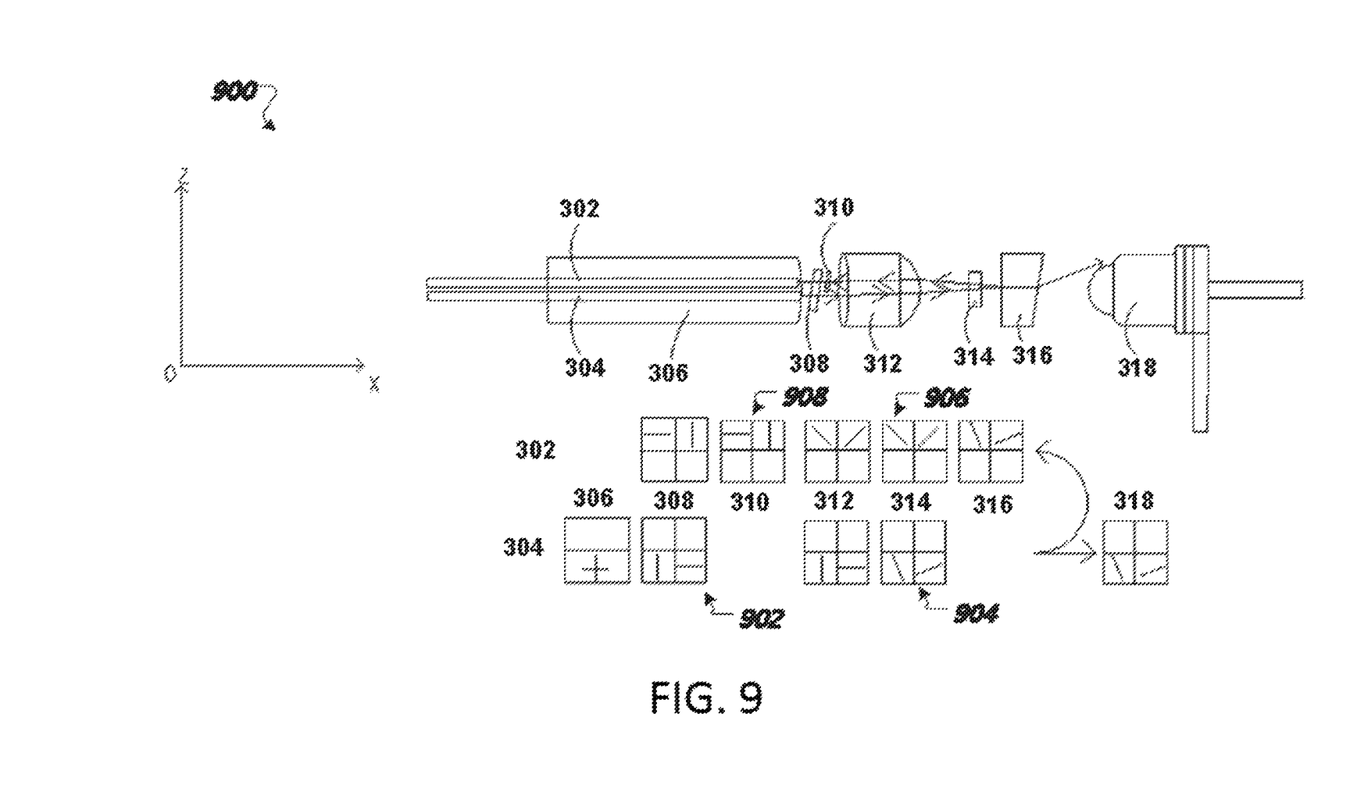
FIG. 9 is a side view of the integrated component of FIG. 3 on the x-z plane showing polarization states.

FIG. 9 is a side view 900 of the integrated component 300 of FIG. 3 on the x-z plane showing polarization states. In particular, the polarization states are shown for light beams passing from the output optical fiber 304 toward the input optical fiber 302, i.e., traveling in a reverse direction. However, as illustrated below, the light beam input to the output optical fiber 304 is blocked or greatly attenuated, e.g., by 10 dB or greater, to limit light exiting the input optical fiber 302.

A light beam, e.g., having optical signals at one or more wavelength, enters the integrated component 300 through output optical fiber 304. The light beam can be randomly polarized. After the light beam exits the output optical fiber 304, the light beam passes through the birefringent crystal 308.

The birefringent crystal 308 separates the optical beam into a first light beam having a first polarization direction and a second light beam having a second polarization direction where the respective polarization directions are orthogonal, as illustrated by box 902 showing the polarization state and location for the two beams relative to a cross-section of the integrated component 300 following the birefringent crystal 308. As shown in box 902, the light beams have been separated in the lower path along the y-axis.

The first and second light beams are located in the lower portion of a cross section of the integrated device and therefore do not pass through the half wave plate 310 after exiting the birefringent crystal 308. The light beams pass through the lens 312 without change in polarization direction and then pass through the Faraday rotator 316. Upon passing through the Faraday rotator 316 the polarization directions are rotated 22.5 degrees counter-clockwise as illustrated by box 904.

The light beams exiting the Faraday rotator 314 are then incident on the prism 316. A first portion of the light beams is passed through the prism 316 while a second portion is reflected. However, due to the output fiber 304 position relative to the lens optic axis and the prism 316 wedge angle direction, the first portion is directed by the prism 316 to exit at an angle that does not provide input to the photo detector 318 or provides a very small amount to be detected by the photo detector 318.

The reflected light beams of the second portion are reflected to the upper path of the cross-section of the integrated component 300. Passing back through the Faraday rotator 314, the polarization directions are rotated by a further 22.5 degrees counter-clockwise resulting in positive and negative 45 degree polarization directions, respectively as illustrated by box 906. The reflected light beams exiting the Faraday rotator 314 pass through the lens 312 without changing polarization direction or relative location in the cross-section and exit the lens 312 toward the half wave plate 310. After passing through the half wave plate 310, the polarization direction of each reflected light beam is rotated by 45 degrees counter-clockwise such that the two light beams again have vertical and horizontal polarization directions, respectively, as shown by box 908.

The reflected light beams enter the birefringent crystal 308. Because of the relative position and the polarization directions, the light beams are not combined by the birefringent crystal 308. Instead, they are further separated such that the exit paths are not incident on the end point of the input optical fiber 302. Thus, the light beams are not passed from the output optical fiber 304 to the input optical fiber 306.

Figure 10:
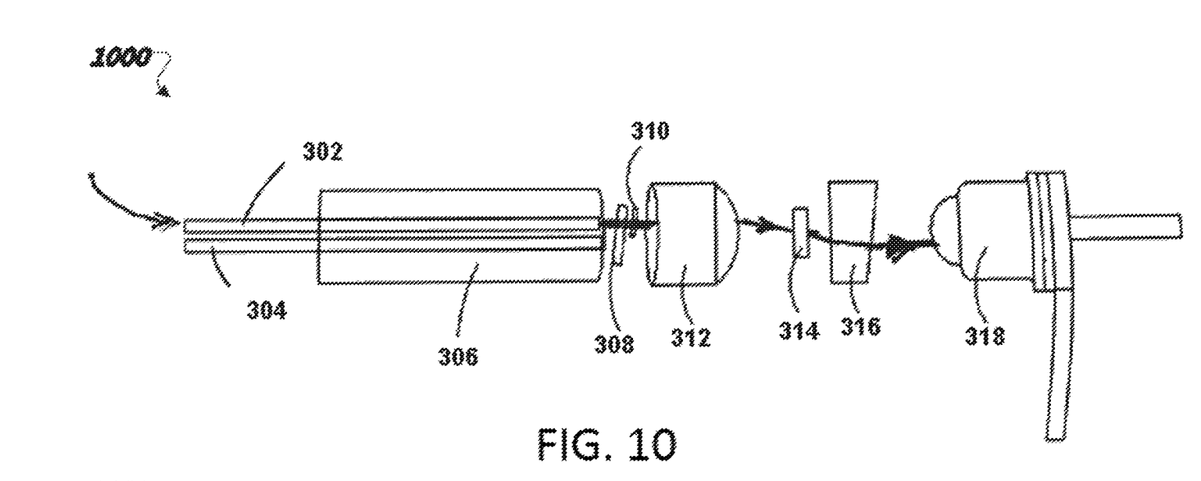
FIG. 10 is a side view of the integrated component of FIG. 3 showing a path from an input fiber to a photo detector.

FIG. 10 is a side view 1000 of the integrated component 300 of FIG. 3 showing a path from the input fiber 302 to the photo detector 318. Light entering the input optical fiber 302 is able to pass through the birefringent crystal 308, the half wave plate 310, the lens 312, and the Faraday rotator 314. A portion passes through the prism 316 depending on a specified transmission rate of the prism 316 while the remaining portion is reflected (not shown). The portion that passes through the prism 316 is directed to the photo detector 318. The photo detector 318 converts incident light to electrical current, which can be used e.g., by an EDFA to determine a power of the light beam entering the integrated component 300.

Figure 11:
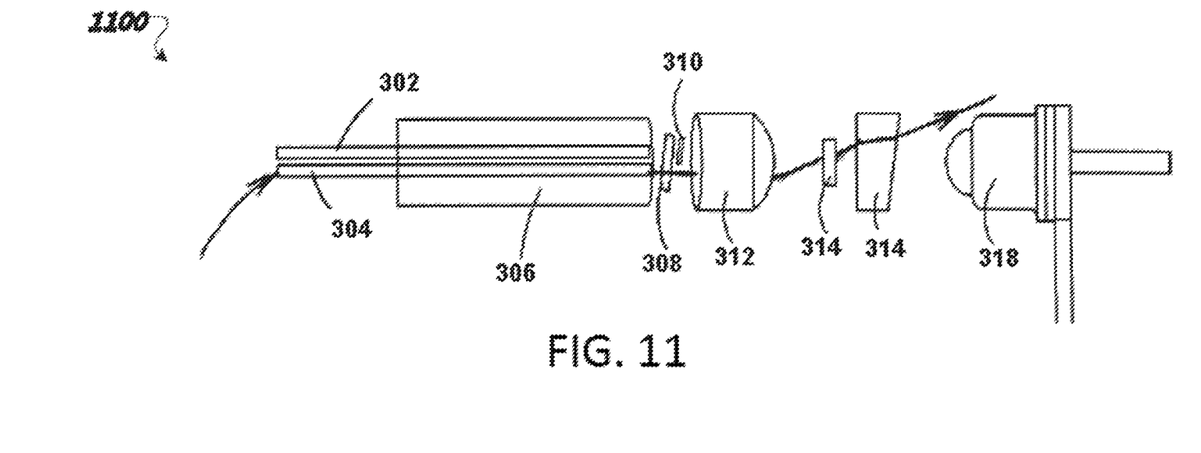
FIG. 11 is a side view of the integrated component of FIG. 3 showing a path from the output fiber to the photo detector.

FIG. 11 is a side view 1100 of the integrated component 300 of FIG. 3 showing a path from the output fiber 304 to the photo detector 318. Light entering the output optical fiber 304 is able to pass through the birefringent crystal 308, the lens 312, and Faraday rotator 314. A portion passes through the prism 316 depending on a specified transmission rate of the prism 316 while the remaining portion is reflected (not shown). However, the portion passing through the prism 316 is now routed such that very little of the light is able to reach the photo detector 318. For example, in some implementations, the electrical current generated by the portion of the light incident on the photo detector 118 originating from the input optical port 302 is 10 times higher than the electrical current generated by the portion of the light incident on the photo detector 118 originating from the output optical port 304. This provides uni-direction of the photo detector response.

Figure 12:
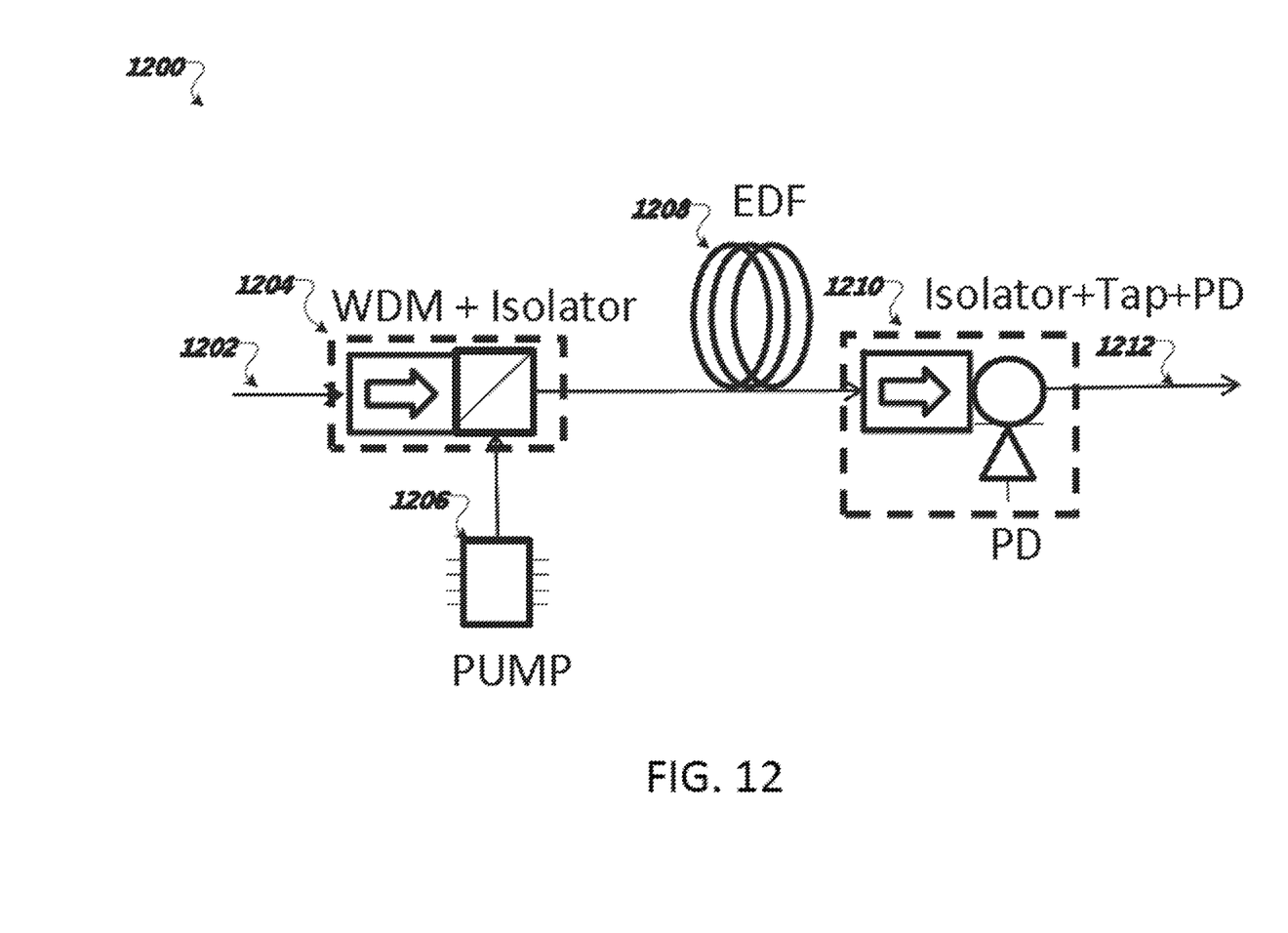
FIG. 12 is a diagram of an example one stage EDFA including an output monitor.

FIG. 12 is a diagram of an example one stage EDFA 1200 including an output monitor. EDFA 1200 include an input optical fiber 1202 providing an input optical signal to an integrated WDM and isolator 1204. A pump source 1206 provides a pump light to the integrated WDM and isolator 1204 such that the WDM combines the input optical signal and the pump light and outputs the combined optical signal to an amplifier fiber 1208. The amplifier fiber 1208, e.g., and EDF, outputs an amplified optical signal to an integrated component 1210 providing isolator, tap, and photo detector functions. The integrated component 1210 is similar to the integrated component 300 described above. The integrated component provides output monitoring of the amplified optical signal prior to the amplified output optical signal exiting the EDFA 1200 from an output optical fiber 1212.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An optical amplifier comprising:
   an input port for receiving an input optical signal;
   a wavelength division multiplexer having a first input coupled to the input port, a second input coupled to a pump source, and an output coupled to an amplification fiber; and
   a first and second integrated component each comprising a tube packaging an input and output fiber, a birefringent crystal, a half wave plate, a lens, a faraday rotator, and a prism, the integrated component configured to provide output monitoring and isolation, wherein the integrated component is configured to: separate a first portion of a light signal received from the amplification fiber, direct the first portion to a photo detector, and direct a second portion of the input light from the amplification fiber to an output port, and wherein the integrated component is configured to attenuate light signals received from the output port; wherein the second integrated component is positioned between the input port and the wavelength division multiplexer, the second integrated component configured to provide input monitoring and isolation wherein the second integrated component is configured to: separate a first portion of the input optical signal received from the first port, direct the first portion to a photo detector and, direct a second portion of the input optical signal to an output coupled to the wavelength division multiplexer, and wherein the second integrated component is configured to attenuate light signals received from the wavelength division multiplexer.

2. The optical amplifier of claim 1, further comprising:
   a controller configured to receive an electrical signal from the photo detector and to control an output power of the pump source based at least in part on the received electrical signal.

3. The optical amplifier of claim 1, wherein the integrated component attenuates light received from the output port by 10 dB or higher.

4. The optical amplifier of claim 1, comprising:
   an isolator and a tap positioned between the input port and the wavelength division multiplexer.

5. The optical amplifier of claim 4, comprising a second photo detector coupled to the tap configured to monitor the input optical signal.

6. The optical amplifier of claim 1, wherein the wavelength division multiplexer is combined with an isolator forming a third integrated component.

7. An integrated component comprising:
   an input optical fiber and an output optical fiber;
   a birefringent crystal having a first surface facing an end of the input optical fiber and the output optical fiber and a second surface facing a wave plate, wherein the wave plate covers a portion of the birefringent crystal;
   a lens optically positioned between the wave plate and a polarization rotator; and
   a prism positioned between the polarization rotator and a photodetector, wherein the prism comprises a first end surface facing the polarization rotator and a second end surface facing the photo detector, wherein the first end surface comprises a partial reflective coating, wherein the second end surface has a high reflection for wavelengths corresponding to a pump source and low or no reflection for wavelengths of the optical signal.

8. The integrated component of claim 7, wherein the polarization rotator is a Faraday rotator.

9. The integrated component of claim 7, wherein the input optical fiber and the output optical fiber are held in a common package.

10. The integrated component of claim 7, wherein an input optical signal received at the input optical fiber is routed to the prism, wherein the prism passes a portion of the input optical signal to the photo detector and reflects a portion of the input optical signal toward the output optical fiber.

11. The integrated component of claim 7, wherein an input optical signal received at the output optical fiber passes through elements of the integrated component such that the optical signal does not pass through the input optical fiber.

* * * * *